United States Patent
Yanagisawa (10) Patent No.: US 9,122,023 B2
(45) Date of Patent: Sep. 1, 2015

(54) OPTICAL WAVEGUIDE DEVICE AND METHOD OF MANUFACTURING THE SAME

(71) Applicant: SHINKO ELECTRIC INDUSTRIES CO., LTD., Nagano-shi, Nagano (JP)

(72) Inventor: Kenji Yanagisawa, Nagano (JP)

(73) Assignee: SHINKO ELECTRIC INDUSTRIES CO., LTD., Nagano-shi (JP)

( * ) Notice: Subject to any disclaimer, the term of this patent is extended or adjusted under 35 U.S.C. 154(b) by 0 days.

(21) Appl. No.: 14/083,829

(22) Filed: Nov. 19, 2013

(65) Prior Publication Data

US 2014/0169731 A1    Jun. 19, 2014

(30) Foreign Application Priority Data

Dec. 13, 2012   (JP) .................. 2012-272251

(51) Int. Cl.
  *G02B 6/12* (2006.01)
  *G02B 6/43* (2006.01)
  *G02B 6/42* (2006.01)
  *G02B 6/122* (2006.01)

(52) U.S. Cl.
  CPC *G02B 6/42* (2013.01); *G02B 6/122* (2013.01); *G02B 6/4214* (2013.01)

(58) Field of Classification Search
  CPC ........................................ G02B 6/42
  See application file for complete search history.

(56) References Cited

U.S. PATENT DOCUMENTS

| | | | |
|---|---|---|---|
| 7,756,366 B2* | 7/2010 | Ohtsu et al. | 385/14 |
| 8,512,500 B2 | 8/2013 | Yamamoto | |
| 2003/0068504 A1* | 4/2003 | Joseph | 428/447 |
| 2006/0171627 A1* | 8/2006 | Aoki et al. | 385/14 |
| 2009/0188610 A1* | 7/2009 | Yamamoto | 156/167 |

FOREIGN PATENT DOCUMENTS

| | | |
|---|---|---|
| JP | 2009-180794 A1 | 8/2009 |
| JP | 2011-75688 A1 | 4/2011 |

\* cited by examiner

*Primary Examiner* — Omar R Rojas
(74) *Attorney, Agent, or Firm* — Kratz, Quintos & Hanson, LLP (57) ABSTRACT

An optical waveguide device includes, a substrate, an optical waveguide arranged on the substrate, an optical element arranged on the substrate and optically coupled to one end part of the optical waveguide, a flame retardant adhesive layer covering the optical waveguide, and a connector portion adhered to other end part of the optical waveguide by the flame retardant adhesive layer.

2 Claims, 9 Drawing Sheets

OPTICAL WAVEGUIDE DEVICE AND METHOD OF MANUFACTURING THE SAME

CROSS-REFERENCE TO RELATED APPLICATIONS

This application is based upon and claims the benefit of priority of the prior Japanese Patent Application No. 2012-272251, filed on Dec. 13, 2012, the entire contents of which are incorporated herein by reference.

FIELD

This invention is related to an optical waveguide device and a method of manufacturing the same.

BACKGROUND

Recently, the development of backbone communication lines mainly based on optical fiber communication technologies is proceeding steadily and, in such a situation, the transmission speeds of electric signals in electrical devices and information terminals are becoming a bottleneck. Against such background, instead of the conventional electric circuit substrate in which all signal transmissions are made by using the electric signal, the optoelectronic composite substrate of the type that transmits high-speed parts by the light has been proposed, in order to compensate the limit of transmission speed of the electric signal.

In the optoelectronic composite substrate, a light signal is transmitted by an optical waveguide which is constructed such that a core layer is surrounded by cladding layers. Then, the light which is propagated through the core layer is reflected in the vertical direction by a light path conversion mirror which is provided to the end part of the optical waveguide to thereby convert the light path.

A related art is disclosed in Japanese Laid-open Patent Publication No. 2009-180794, Japanese Laid-open Patent Publication No. 2011-75688.

SUMMARY

As explained in the column of preliminary matter described later, in order for an optical waveguide device to have flame retardant property, there is no need to newly introduce a flame retardant material as the additional layer. Thus there is a problem that the cost rise is caused.

One aspect of the following disclosure provides an optical waveguide device, including, a substrate, an optical waveguide arranged on the substrate, an optical element arranged on the substrate, and optically coupled to one end part of the optical waveguide, a flame retardant adhesive layer covering the optical waveguide, and a connector portion adhered to other end part of the optical waveguide by the flame retardant adhesive layer.

Moreover, another aspect of the disclosure provides an optical waveguide device, including, a substrate, an optical waveguide arranged on the substrate, an optical element arranged on the substrate, and optically coupled to one end part of the optical waveguide, and a flame retardant underfill resin filled under the optical element, and covering the optical waveguide.

Moreover, another aspect of the disclosure provides a method of manufacturing an optical waveguide device, including, forming an optical waveguide on a substrate, arranging an optical element on the substrate, the optical element optically coupled to one end part of the optical waveguide, covering the optical waveguide with a flame retardant adhesive layer, and adhering a connector portion to other end part of the optical waveguide by the flame retardant adhesive layer.

Moreover, another aspect of the disclosure provides a method of manufacturing an optical waveguide device, including, forming an optical waveguide on a substrate, arranging an optical element on the substrate, the optical element optically coupled to one end part of the optical waveguide, and forming a flame retardant underfill resin on the optical waveguide from a lower side of the optical element.

The object and advantages of the invention will be realized and attained by means of the elements and combination particularly pointed out in the claims.

It is to be understood that both the foregoing general description and the following detailed description are exemplary and explanatory and are not restrictive of the invention, as claimed.

DESCRIPTION OF EMBODIMENTS

Hereinbelow, embodiments will be described with reference to the accompanying drawings.

Before explaining the embodiments, a preliminary matter that forms the basis will be explained. In the preliminary matter, the problem when providing a flame retardant layer to an optical waveguide device will be explained, therefore the detailed explanation of each element is omitted, and will be explained in detail in the embodiments to be described later.

Figure 1A:
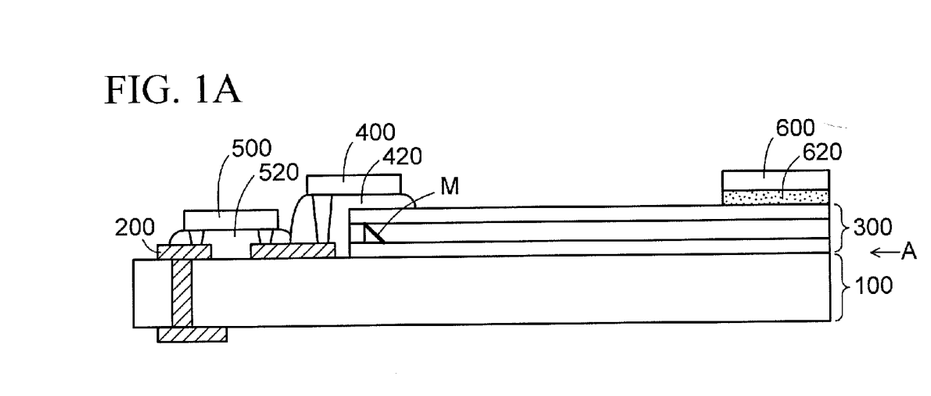
FIGS. 1A and 1B are a cross-sectional view and a side view depicting an example of an optical waveguide device according to a preliminary matter.

As depicted in FIG. 1A, in an optical waveguide device according to the preliminary matter, an optical waveguide 300 including a light path conversion mirror M at one end part thereof is arranged on a wiring substrate 100 including wiring layers 200. Optical element 400 such as light emitting element is connected to the wiring layers 200 of the wiring substrate 100. The optical element 400 is optically coupled to the light path conversion mirror M of the optical waveguide 300. Underfill resin 420 is filled under the optical element 400.

Moreover, circuit element 500 such as driver element associated with the optical element 400 is connected to the wiring layers 200 of the wiring substrate 100. Furthermore, similarly underfill resin 520 is filled under the circuit element 500.

Figure 1B:
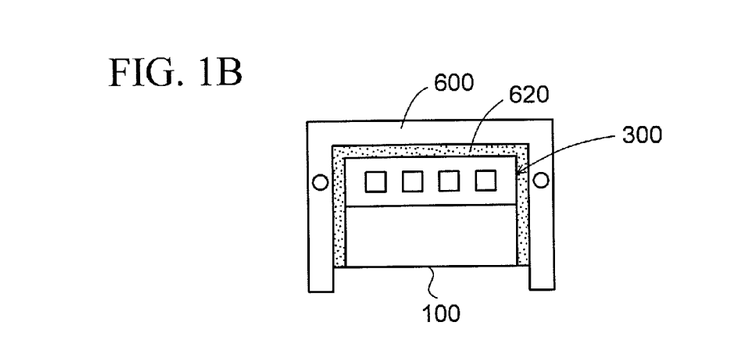

FIG. 1B is a side view of the optical waveguide device in FIG. 1A as seen from direction A. Referring to add FIG. 1B, a connector portion 600 for connecting to the other optical fiber or the like is adhered to the other end part of the wiring substrate 100 and the optical waveguide 300 by an adhesive layer 620.

Figure 2:
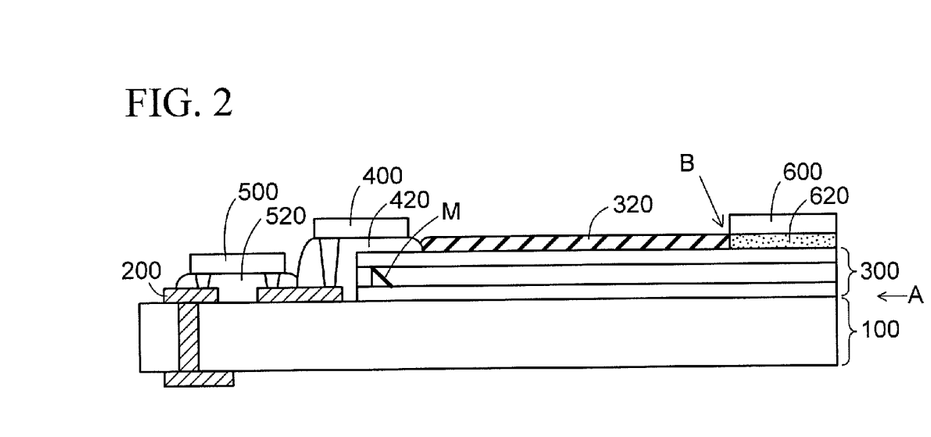
FIG. 2 is a cross-sectional view depicting a state that the optical waveguide device in FIGS. 1A and 1B is covered with a flame retardant layer.

The optical waveguide 300 in the optical waveguide device depicted in FIG. 1A does not have flame retarding properties itself. For this reason, as depicted in FIG. 2, in order for the optical waveguide device to have flame retarding properties, there is needed to specially prepare a flame retardant material and cover the optical waveguide 300 with a flame retardant layer 320.

As described above, in order for the optical waveguide device to have flame retardant property, the step of forming the flame retardant layer 320 is additionally needed. This increases the material cost and the number of manufacturing steps. Thus there is a problem that the cost rise is caused.

Moreover, in the case that the wiring substrate 100 is a flexible substrate such as a polyimide film, when the substrate is bent, there is a fear that the flame retardant layer 320 is peeled at a boundary B of the connector portion 600 and the flame retardant layer 320, thus sufficient reliability cannot be obtained.

The embodiments to be explained below can solve the problems mentioned above.

First Embodiment

Figure 3A:
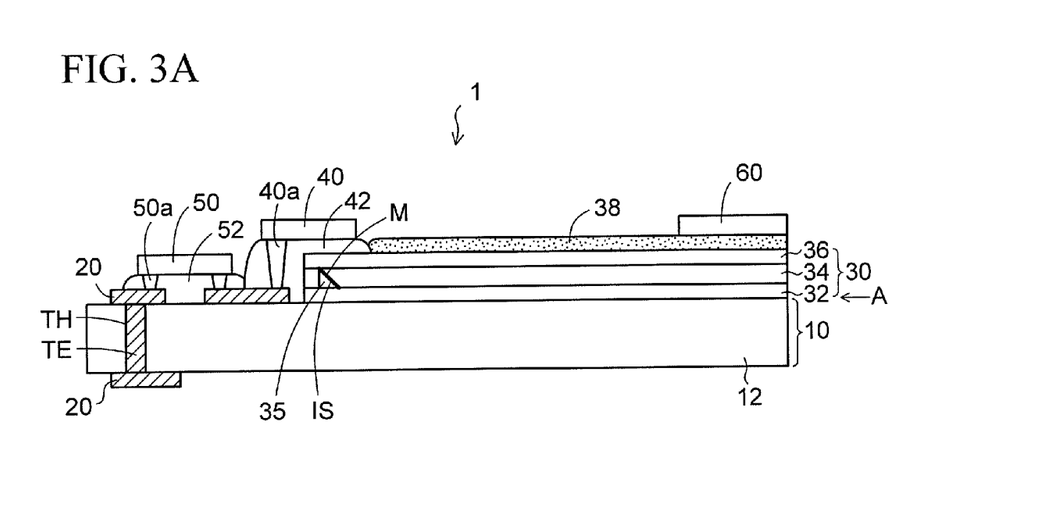
FIGS. 3A and 3B are a cross-sectional view and a side view depicting an optical waveguide device of a first embodiment.
Figure 3B:
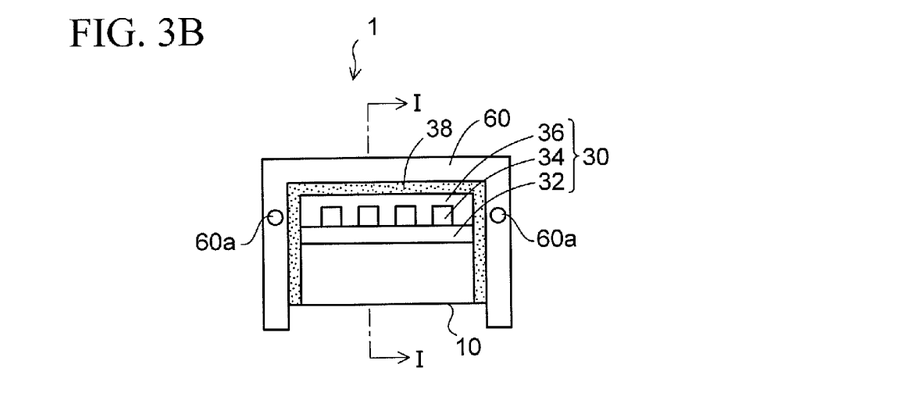

FIGS. 3A and 3B are views depicting an optical waveguide device of a first embodiment. FIGS. 4A to 7B are views depicting a method of manufacturing an optical waveguide device of the first embodiment.

As depicted in FIG. 3A, in an optical waveguide device 1 of the first embodiment, an optical waveguide 30 is arranged on a wiring substrate 10. In the wiring substrate 10, wiring layers 20 are formed on both surfaces of a substrate 12, respectively. Through-holes TH penetrating in the thickness direction are provided in the substrate 12, and penetration electrodes TE are filled in the through-holes TH. The wiring layers 20 on both surfaces are connected to each other by the penetration electrodes TE.

Note that the wiring layers 20 on both surfaces may be connected to each other by through-hole plating layers formed on the sidewalls of the through-holes TH, and resin may be filled in the remaining hole parts in the through-holes TH.

The substrate 12 may be a rigid substrate or a flexible substrate.

In the case of employing the rigid substrate, for example, the substrate 12 is formed of glass epoxy resin or the like. Alternatively, in the case of employing the flexible substrate, for example, the substrate 12 is formed of a polyimide film or the like.

The optical waveguide 30 is formed of a first cladding layer 32, a core layer 34 formed on the first cladding layer 32, and a second cladding layer 36 covering the core layer 34, and has a structure in which the core layer 34 is surrounded by the first and second cladding layers 32 and 36. The refractive index of the core layer 34 is set higher than the refractive indexes of the first cladding layer 32 and the second cladding layer 36.

A light path conversion mirror M formed of light reflective metal is arranged in one end part of the core layer 34 of the optical waveguide 30.

Optical element 40 is arranged on one end part of the wiring substrate 10, and bump electrodes 40a of the optical element 40 are connected to the wiring layers 20 of the wiring substrate 10. Transparent underfill resin 42 is filled between the optical element 40, and the wiring substrate 10 and the optical waveguide 30.

As the optical element 40A, a light emitting element or a light receiving element is used. As the light emitting element, a surface emitting laser (VCSEL: Vertical Cavity Surface Emitting Laser) is preferably used, and as the light receiving element, a photodiode is preferably used.

Then, the optical element 40 is optically coupled to the light path conversion mirror M of the optical waveguide 30. In the case that the optical element 40 is the light emitting element, a light emitting portion arranged on the lower face of the light emitting element is optically coupled to the light path conversion mirror M. Alternatively, in the case that the optical element 40 is the light receiving element, a light receiving portion arranged on the lower face of the light receiving element is optically coupled to the light path conversion mirror M.

Moreover, a circuit element 50 is arranged on the wiring substrate 10 at a lateral side of the optical element 40. Bump electrodes 50a of the circuit element 50 are connected to the wiring layers 20 of the wiring substrate 10. Underfill resin 52 is filled in a gap between the circuit element 50 and the wiring substrate 10.

The circuit element 50 is electrically connected to the optical element 40 through the wiring layers 20 of the wiring substrate 10.

In the case that the optical element 40 is the light emitting element, a driver element is used as the circuit element 50. Alternatively, in the case that the optical element 40 is the light receiving element, an amplifier element (TIA: Transimpedance Amplifier or the like) is used as the circuit element 50.

Then, the whole of the optical waveguide 30, including an upper face and side faces thereof, is covered with a flame retardant adhesive layer 38. As an example of the flame retardant adhesive layer 38, "NB3000" manufactured by Daizo Corporation (Nichimoly Division) can be preferably used. As the flame retardant adhesive layer 38, there is a layer having flame retardant property which is obtained by including a flame retardant such as silica particles, silver particles or magnesium hydrate into an epoxy resin or the like.

FIG. 3B is a side view of the optical waveguide device 1 in FIG. 3A as seen from side A. FIG. 3A is a cross-sectional view taken along line I-I in FIG. 3B.

Referring to add FIG. 3B to FIG. 3A, a connector portion 60 is adhered to the other end part of the wiring substrate 10 and the optical waveguide 30 by the flame retardant adhesive layer 38.

In the optical waveguide device 1 of the first embodiment, the flame retardant adhesive layer 38 is used as an adhesive layer for adhering the connector portion 60. Then, the flame retardant adhesive layer 38 is formed to extend on the optical waveguide 30. Thus the whole of the optical waveguide device 1 including the upper face and the side faces has the flame retardant property. In this way, in the first embodiment, the adhesive layer for adhering the connector portion 60 functions as the flame retardant layer as well.

Accordingly, there is no need to newly introduce the flame retardant material as the additional layer, and also there is no need to add a step of forming the flame retardant layer. By this matter, the optical waveguide device 1 having flame retardant property can be easily manufactured without causing the cost rise.

Moreover, the flame retardant adhesive layer is formed integrally as the same layer on substantially the whole of the optical waveguide 30 including the lower region of the connector portion 60, and therefore no boundary with the other materials exists on the optical waveguide 30. For this reason, when the substrate 12 is the flexible substrate such as the polyimide film, even if the substrate 12 is bent, there is no fear that the flame retardant adhesive layer 38 is peeled.

As depicted in FIG. 3B, fitting holes 60a are provided in the side face of the outer end of the connector portion 60 attached to the optical waveguide device 1. By fitting the alignment pins of an external optical fiber or the like (not depicted) into the fitting holes 60a in the connector portion 60, the external optical fiber or the like is aligned and set to the optical waveguide 30 and is optically coupled to the optical waveguide 30.

Next, light propagation in the optical waveguide device 1 of the first embodiment will be explained. In the case that the optical element 40 is the light emitting element, the circuit element 50 is arranged as the driver element. An electric signal outputted from the driver element is supplied to the light emitting element, and light is emitted downward from the light emitting surface of the light emitting element.

The light emitted from the light emitting element is transmitted through the underfill resin 42, the second cladding layer 36, and the core layer 34 and reaches the light path conversion mirror M. Further, the light is reflected by the light path conversion mirror M, and the light path is converted by 90°, thus the light is entered into the core layer 34.

Then, the light entered into the core layer 34 propagates inside the core layer 34 by repeating total reflection and is entered into the external optical fiber or the like through the connector portion 60.

Contrary, in the case that the optical element 40 is the light receiving element, the circuit element 50 is arranged as the amplifier element. In this case, the light propagates in the reverse directions to the optical path described above, and the light is entered into the light receiving surface of the light receiving element. Further, the light signal is converted into an electric signal by the light receiving element, and that electric signal is supplied to the amplifier element.

Figure 4A:
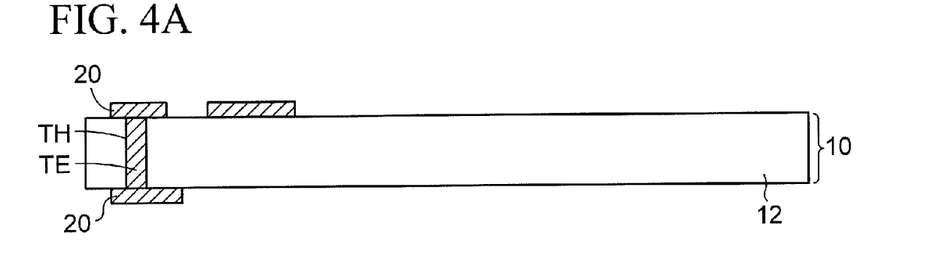
FIGS. 4A to 4D are cross-sectional views depicting a method of manufacturing an optical waveguide device of the first embodiment (Part 1).

Next, a method of manufacturing the optical waveguide device of the first embodiment will be explained. As depicted in FIG. 4A, first, the wiring substrate 10 having the aforementioned structure is prepared. The through-holes TH in the wiring substrate 10 are formed by a drill, a laser, or the like, and the wiring layers 20 on both surfaces and the penetration electrodes TE are formed by using the plating and the photolithography or the like.

Figure 4B:
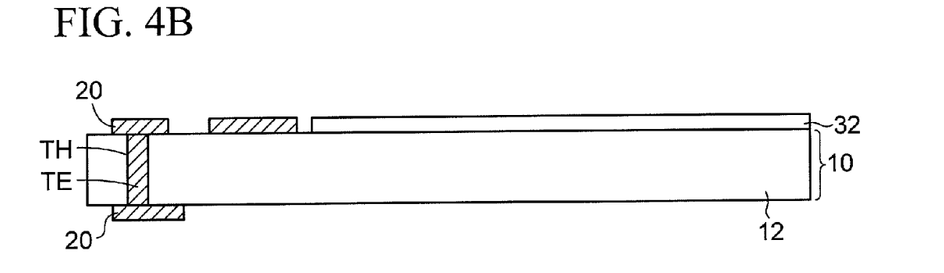

Then, as depicted in FIG. 4B, a photosensitive resin layer (not depicted) for obtaining the first cladding layer 32 is formed in an optical waveguide forming region on the wiring substrate 10, and the exposure and the development are performed on the basis of the photolithography. Then, the photosensitive resin layer is cured by a heating process at about 100° C. to 140° C. By this matter, the first cladding layer 32 is formed in the optical waveguide forming region on the wiring substrate 10. The thickness of the first cladding layer 32 is about 10 μm to 30 μm, for example.

As the photosensitive resin layer, UV curable epoxy resin or the like is preferably used. As the method of forming the photosensitive resin layer, a semi-cured (B-stage) photosensitive resin sheet may be attached, or liquid photosensitive resin may be coated.

Similar resin is preferably used in later-described steps of forming the core layer 34 and the second cladding layer 36.

Figure 4C:
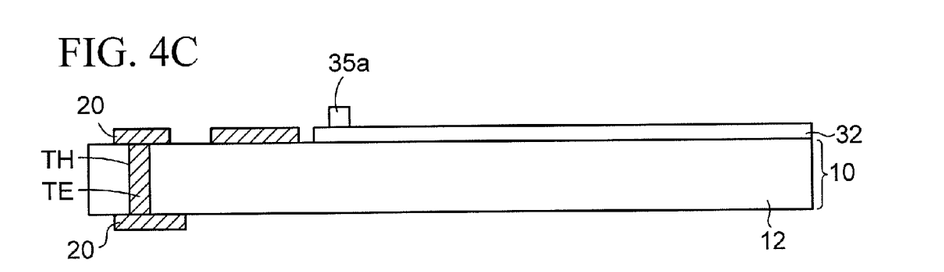

Thereafter, as depicted in FIG. 4C, a photosensitive resin layer (not depicted) is formed on the first cladding layer 32. Further, the exposure and the development are performed on the basis of the photolithography, and then the photosensitive resin layer is cured by a heating process at about 100° C. to 140° C.

By this matter, a protruding pattern 35a whose cross section has a quadrangle shape is obtained in a belt-shaped region including a part where the light path conversion mirror M of the optical waveguide 30 is to be arranged.

Figure 4D:
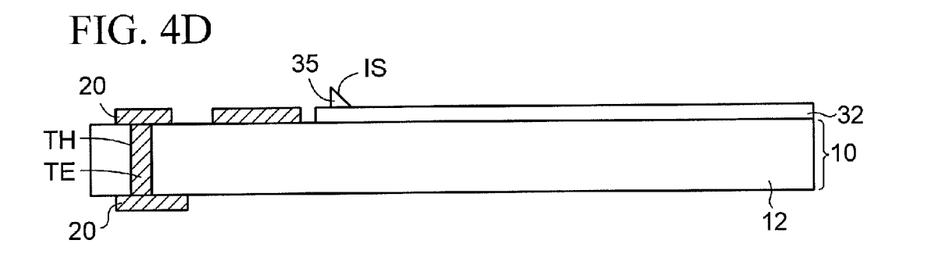

Further, as depicted in FIG. 4D, a part of the protruding pattern 35a is dicing-cut toward an inclined direction by a blade of a dicing machine, thus an optical path conversion member 35 having an optical path conversion inclined surface IS is obtained. The optical path conversion inclined surface IS is formed to incline preferably at 45° with respect to the surface of the wiring substrate 10.

Figure 5A:
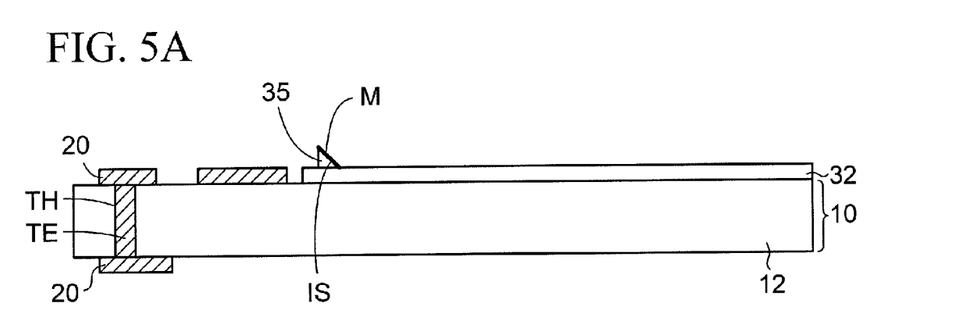
FIGS. 5A to 5C are cross-sectional views depicting the method of manufacturing an optical waveguide device of the first embodiment (Part 2).

Then, as depicted in FIG. 5A, a metal layer having the light reflective property is formed partially on the optical path conversion inclined surface IS of the optical path conversion member 35 by a mask vapor deposition or the like, thus the light path conversion mirror M is obtained. As the light reflective metal, gold, aluminum, or the like is available.

Figure 5B:
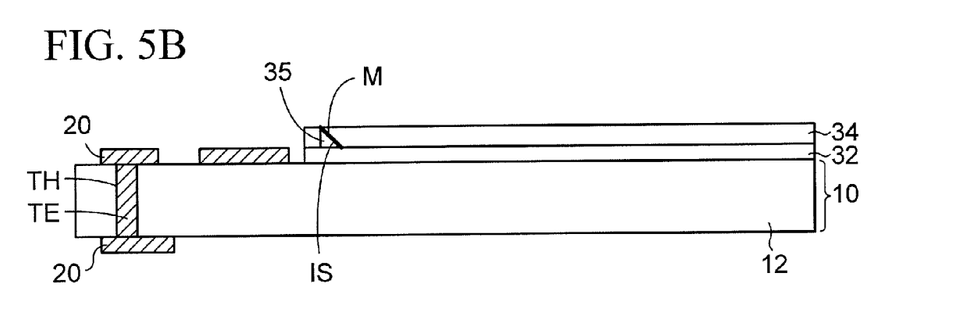

Thereafter, as depicted in FIG. 5B, a photosensitive resin layer (not depicted) for obtaining the core layer is formed on the first cladding layer 32. Further, the exposure and the development are performed on the basis of the photolithography, and then the photosensitive resin layer is cured by the heating process at about 100° C. to 140° C.

By this matter, the core layer 34 is formed on the first cladding layer 32 such that the core layer 34 is arranged side by side as plural belt-shaped patterns. Moreover, it is in a state that the light path conversion mirror M is buried in the core layer 34. The thickness of the core layer 34 is about 30 μm to 80 μm, and the arrangement pitch of the core layers 34 is about 250 μm.

Figure 5C:
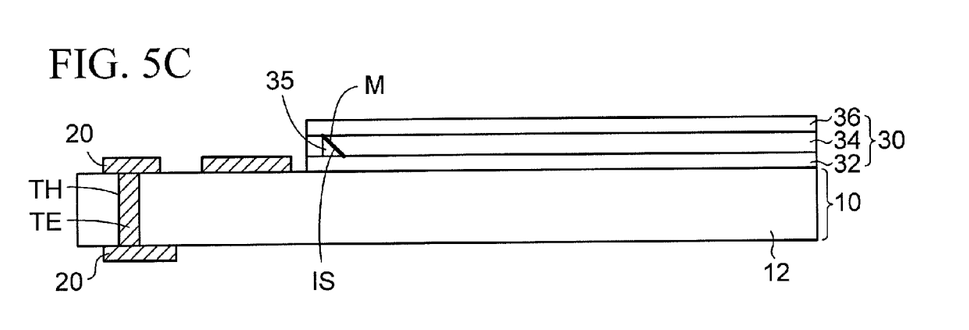

Then, as depicted in FIG. 5C, a photosensitive resin layer (not depicted) for obtaining the second cladding layer 36 is formed on the first cladding layer 32 and the core layer 34. Further, the exposure and the development are performed on the basis of the photolithography, and then the photosensitive resin layer is cured by the heating process at about 100° C. to 140° C.

By this matter, the second cladding layer 36 covering the core layer 34 is formed on the first cladding layer 32. The thickness of the second cladding layer 36 is set to be a thickness of about 10 μm to 30 μm from the upper face of the core layer 34.

By the above steps, the optical waveguide 30 having a structure in which the core layer 34 is surrounded by the first cladding layer 32 and the second cladding layer 36 is obtained on the wiring substrate 10.

Figure 6A:
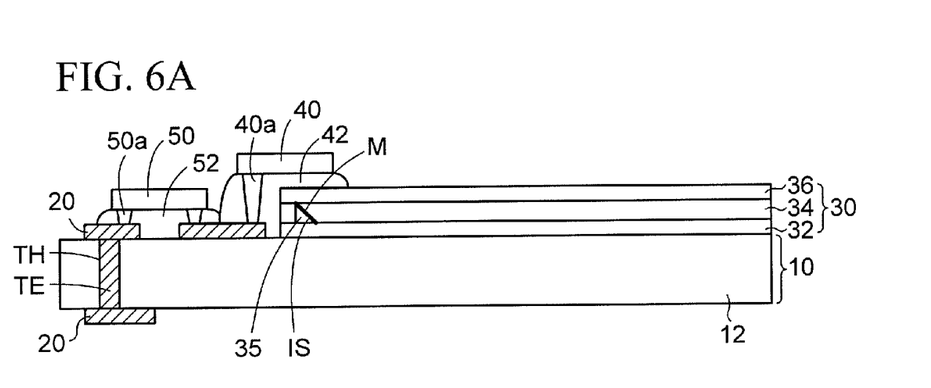
FIGS. 6A and 6B are cross-sectional views depicting the method of manufacturing an optical waveguide device of the first embodiment (Part 3).

Thereafter, as depicted in FIG. 6A, the bump electrodes 40a of the optical element 40 are connected to the wiring layers 20 of the wiring substrate 10 through the solder or the like. The optical element 40 is arranged on the wiring substrate 10 so as to be optically coupled to the light path conversion mirror M of the optical waveguide 30. Further, the underfill resin 42 is filled under the optical element 40.

Then, the bump electrodes 50a of the circuit element 50 are connected to the wiring layers 20 of the wiring substrate 10 through the solder or the like. The circuit element 50 is arranged side by side in the lateral side of the optical element 40 and is electrically connected to the optical element 40 through the wiring layers 20. Further, similarly the underfill resin 52 is filled under the circuit element 50.

Figure 6B:
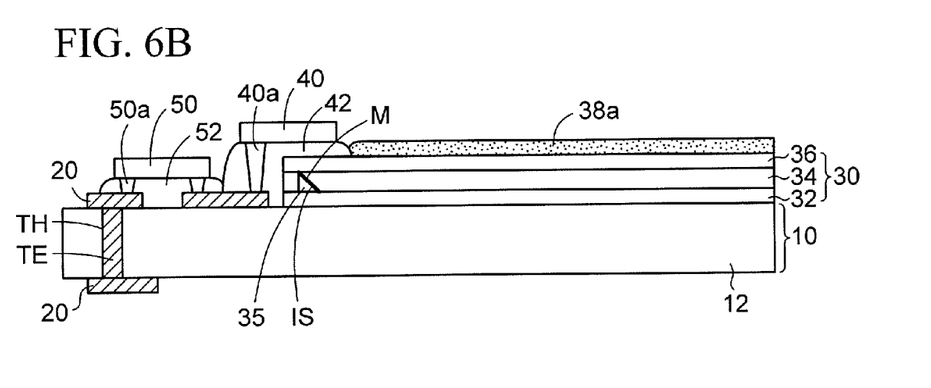

Thereafter, as depicted in FIG. 6B, an uncured flame retardant adhesive layer 38a is formed in the whole on the optical waveguide 30. The uncured flame retardant adhesive layer 38a may be formed by coating liquid flame retardant adhesive or by attaching an uncured (B-stage) flame retardant resin film.

Figure 7A:
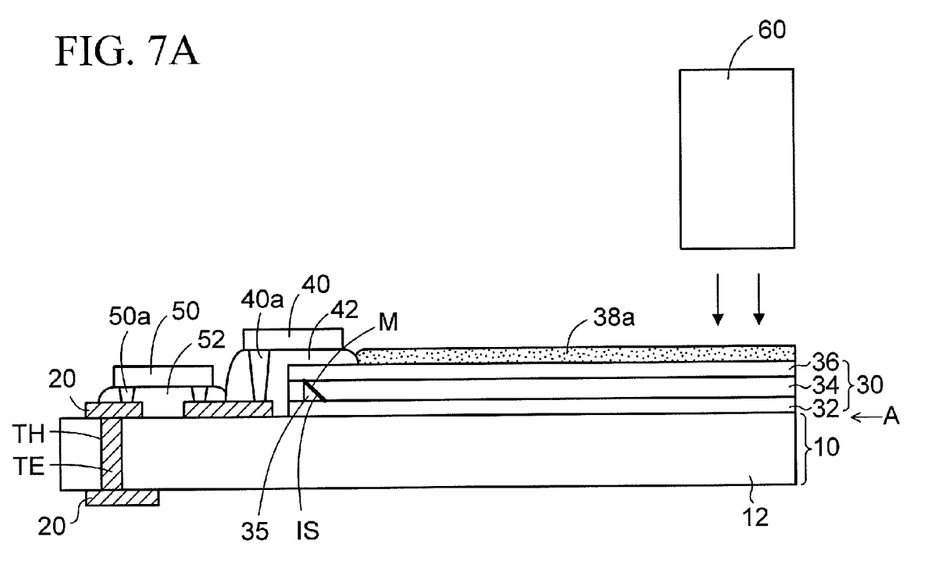
FIGS. 7A and 7B are a cross-sectional view and a side view depicting the method of manufacturing an optical waveguide device of the first embodiment (Part 4).
Figure 7B:
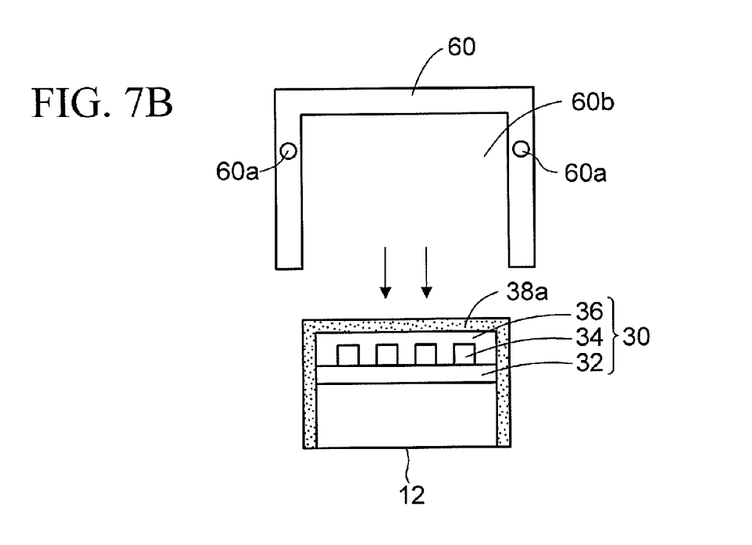

Thereafter, as depicted in FIGS. 7A and 7B, the connector portion 60 having a reverse U-shape in which a cavity 60b is provided in an inside thereof is prepared. FIG. 7B is a side view of FIG. 7A as seen from direction A. Then, the connector portion 60 is arranged on the optical waveguide 30 through the uncured flame retardant adhesive layer 38a such that the other end part of the optical waveguide 30 is arranged in the cavity 60b of the connector portion 60.

Thereafter, a heating process is performed at a temperature of 90° C. to 100° C. to cure the uncured flame retardant adhesive layer 38a. By this matter, as depicted in FIGS. 3A and 3B mentioned earlier, the connection portion 60 is adhered to the optical waveguide 30 and the wiring substrate 10 by the cured flame retardant adhesive layer 38.

As mentioned earlier, in the method of manufacturing an optical waveguide device of the first embodiment, the flame retardant adhesive layer 38 is used as an adhesive layer for adhering the connector portion 60, and that flame retardant adhesive layer 38 covers the optical waveguide 30, thereby providing flame retardant property to the optical waveguide 30. For this reason, there is no need to newly introduce a flame retardant material as the additional layer, and there is no need to add a step of forming a flame retardant layer. Accordingly, the optical waveguide device having flame retardant property can be easily manufactured without causing the cost rise.

Second Embodiment

FIGS. 8 to 10B are views depicting optical waveguide devices of a second embodiment. FIGS. 11A and 11B are views depicting a method of manufacturing an optical waveguide device of the second embodiment.

Figure 8:
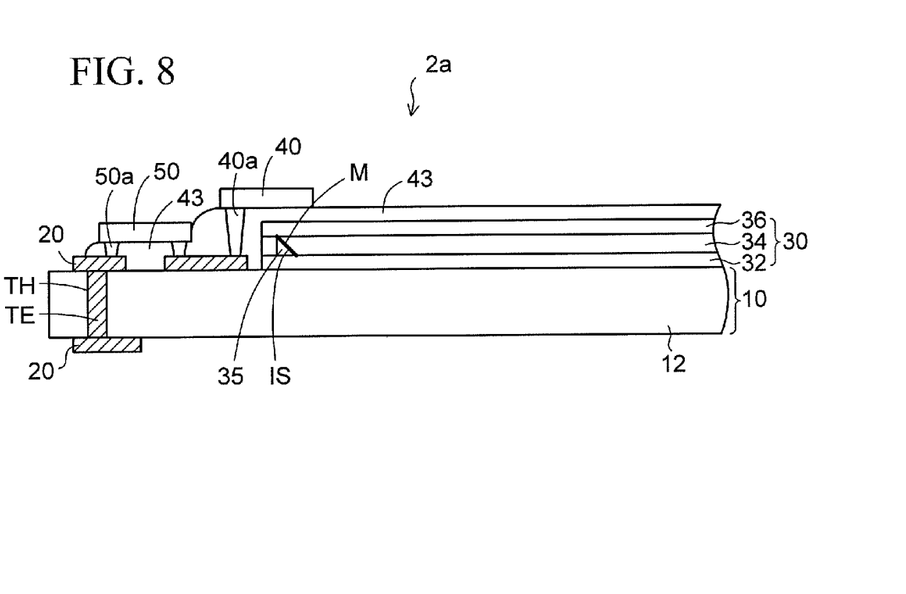
FIG. 8 is a cross-sectional view depicting a first optical waveguide device of a second embodiment.

As depicted in FIG. 8, in a first optical waveguide device 2a of the second embodiment, instead of using the flame retardant adhesive layer 38 in the optical waveguide device 1 of the first embodiment, a transparent flame retardant underfill resin 43 having the flame retardant property is used as underfill resin filled under the optical element 40.

Then, the flame retardant underfill resin 43 is formed to extend in the whole on the optical waveguide 30 from a gap between the optical element 40 and the wiring substrate 10. As the transparent flame retardant underfill resin 43 having the flame retardant property, the material obtained by including a flame retardant such as silica particles into epoxy resin or the like can be used.

In the example of FIG. 8, the flame retardant underfill resin 43 of the same material is filled also in a gap between the circuit element 50 and the wiring substrate 10. In this way, in the first optical waveguide device 2a, the flame retardant underfill resin 43 is formed integrally under the optical element 40, and under the circuit element 50, and on the optical waveguide 30.

In also the second embodiment, similarly to the first embodiment, there is no need to newly introduce the material having the flame retardant property as the additional layer, and there is no need to add the step of forming the flame retardant layer. Accordingly, the optical waveguide device having the flame retardant property can be easily manufactured without causing the cost rise.

Figure 9:
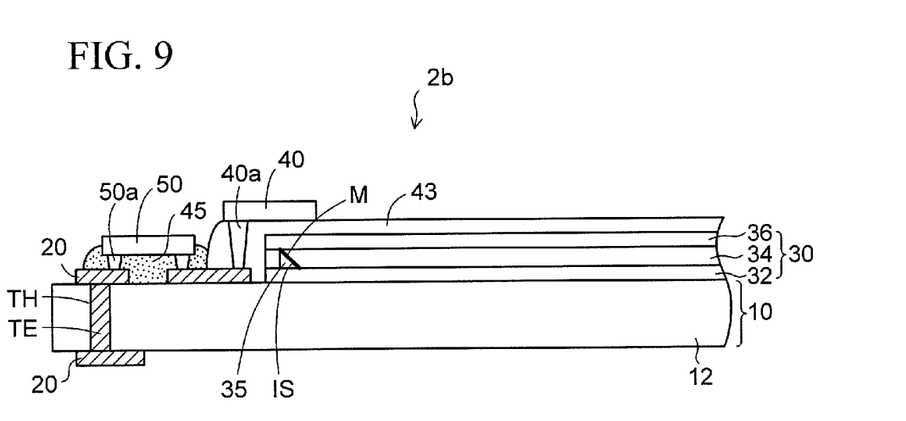
FIG. 9 is a cross-sectional view depicting a second optical waveguide device of the second embodiment.

FIG. 9 depicts a second optical waveguide device 2b of the second embodiment. As depicted in FIG. 9, in the second optical waveguide device 2b, the flame retardant underfill resin 43 is formed only in the region on the optical waveguide 30 from the lower side of the optical element 40, and different underfill resin 45 is filled under the circuit element 50.

That is, the flame retardant underfill resin 43 is not necessarily filled under the circuit element 50, and non-transparent underfill resin having no flame retardant property may be filled under the circuit element 50.

In the optical waveguide devices 2a and 2b in the modes of FIGS. 8 and 9, the connector portion is not provided at their end parts. In these modes, in the case that the optical element 40 is the light emitting element, the light receiving element (not depicted) is optically coupled to the opposite end of the optical waveguide 30 on the same wiring substrate 10. Also contrary, in the case that the optical element 40 is the light receiving element, the light emitting element (not depicted) is optically coupled to the opposite end of the optical waveguide 30 on the same wiring substrate 10.

Figure 10A:
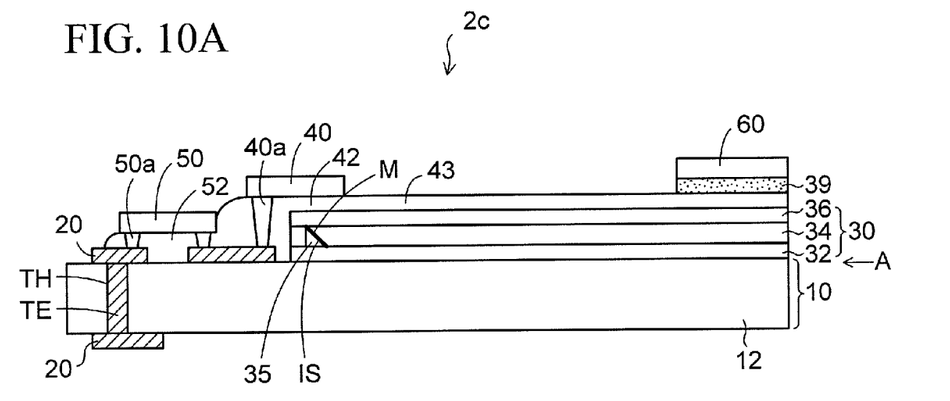
FIGS. 10A and 10B are a cross-sectional view and a side view depicting a third optical waveguide device of the second embodiment.
Figure 10B:
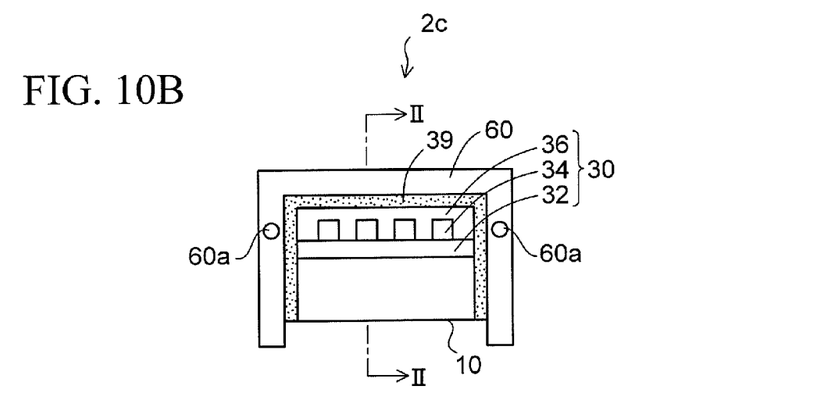
Figure 11A:
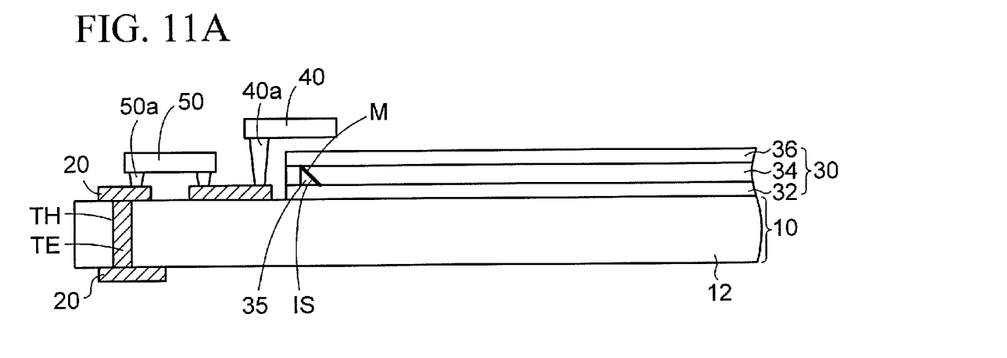
FIGS. 11A and 11B are cross-sectional views depicting a method of manufacturing an optical waveguide device of the second embodiment.
Figure 11B:
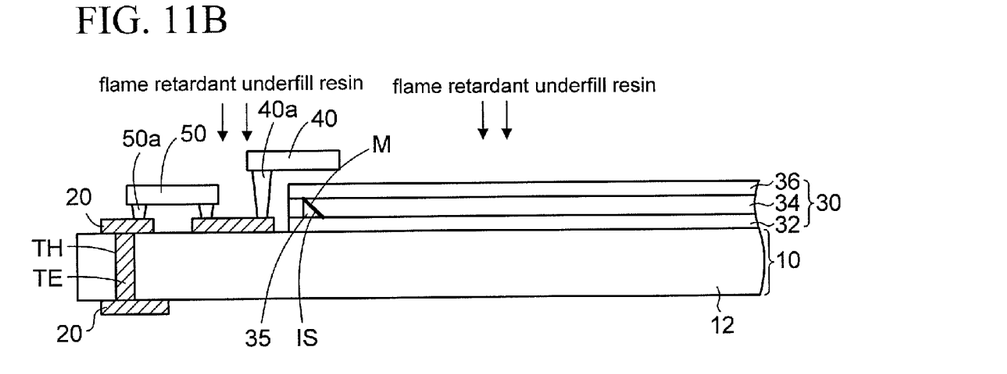

FIG. 10A depicts a third optical waveguide device 2c of the second embodiment. FIG. 10B is a side view of the optical waveguide device 2c in FIG. 10A as seen from direction A.

As depicted in FIGS. 10A and 10B, in the third optical waveguide device 2c, the connector portion 60 is adhered to the other end part of the optical waveguide 30 in the first optical waveguide device 2a in FIG. 8 by an adhesive layer 39. The adhesive layer in the third optical waveguide device 2c does not need to have flame retardant property, but it is no problem even if the adhesive layer 39 has flame retardant property.

In the third optical waveguide device 2c, the flame retardant underfill resin 43 is formed integrally as the same layer in substantially the whole of the optical waveguide 30 including the lower region of the connector portion 60, and no boundary with the other materials exists on the optical waveguide 30.

For the reason, similarly to the first embodiment, in the case that the substrate 12 is the flexible substrate such as a polyimide film or the like, even when the substrate 12 is bent, there is no fear that the flame retardant underfill resin 43 is peeled The same applies to the first and second optical waveguide devices 2a and 2b described above.

In the third optical waveguide device 2c, similarly to the first embodiment, the optical fiber or the like (not depicted) is optically coupled to the optical waveguide 30 by fitting the alignment pins of the external optical fiber or the like into fitting holes 60a in the connector portion 60.

In the method of manufacturing the optical waveguide device of the second embodiment, as depicted in FIG. 11A, first, by using the method similar to the first embodiment, the optical waveguide 30 is formed on the wiring substrate 10, and the optical element 40 and the circuit element 50 are connected to the wiring layers 20 of the wiring substrate 10 respectively.

Then, as depicted in FIG. 11B, the flame retardant underfill resin 43 is coated in the vicinity of the optical element 40 and the circuit element 50 and on the optical waveguide 30 by a dispenser (not depicted) or the like.

The flame retardant underfill resin 43 permeates the gaps between the optical element 40 and the circuit element 50, and the wiring substrate 10 by the capillary action and also is coated to spread on the optical waveguide 30. Thereafter the flame retardant underfill resin 43 is cured by a heating process at a temperature of 100° C. to 150° C.

In the case of manufacturing the second optical waveguide device 2b in FIG. 9, first, the flame retardant underfill resin 43 is formed on the optical waveguide 30 from the lower side of the optical element 40 and is cured. Then, the different underfill resin 45 is filled in the lower side of the circuit element 50 and is cured.

Alternatively, contrary to the above, first, the underfill resin 45 is filled under the circuit element 50 and is cured, and then the flame retardant underfill resin 43 is formed on the optical waveguide 30 from the lower side of the optical element 40 and is cured.

As mentioned earlier, in the method of manufacturing an optical waveguide device of the second embodiment, as the underfill resin for sealing the lower side of the optical element 40, the flame retardant underfill resin 43 is used, and that flame retardant underfill resin 43 covers the optical waveguide 30, thereby providing flame retardant property to the optical waveguide 30.

For the reason, similarly to the first embodiment, the optical waveguide device having flame retardant property can be easily manufactured without causing the cost rise.

Further, the clauses are disclosed about the above embodiment hereinafter.

(Clause 1) A method of manufacturing an optical waveguide device, comprising:

forming an optical waveguide on a substrate;

arranging an optical element on the substrate, the optical element optically coupled to one end part of the optical waveguide;

covering the optical waveguide with a flame retardant adhesive layer; and adhering a connector portion to other end part of the optical waveguide by the flame retardant adhesive layer.

(Clause 2) A method of manufacturing an optical waveguide device, comprising:

forming an optical waveguide on a substrate;

arranging an optical element on the substrate, the optical element optically coupled to one end part of the optical waveguide; and forming a flame retardant underfill resin on the optical waveguide from a lower side of the optical element.

(Clause 3) The method of manufacturing an optical waveguide device according to Clause 2, wherein a circuit element is arranged on the substrate, the circuit element electrically connected to the optical element, and in the forming of the flame retardant underfill resin, the flame retardant underfill resin is filled also under the circuit element.

(Clause 4) The method of manufacturing an optical waveguide device according to Clause 2, after the forming of the flame retardant underfill resin, further comprising adhering a connector portion to other end part of the optical waveguide by an adhesive layer.

(Clause 5) The method of manufacturing an optical waveguide device according to Clause 1, wherein the optical element is any one of a light emitting element and a light receiving element.

What is claimed is:

1. An optical waveguide device, comprising:

a substrate;

an optical waveguide arranged on the substrate;

an optical element arranged on the substrate, and optically coupled to one end part of the optical waveguide;

underfill resin filled under the optical element;

a flame retardant adhesive layer covering an upper face and a side face of the optical waveguide, the flame retardant adhesive layer formed to contact the underfill resin; and a connector portion adhered to other end part of the optical waveguide by the flame retardant adhesive layer, wherein the connector portion is adhered to the upper face and the side face of the optical waveguide.

2. The optical waveguide device according to claim 1, wherein the optical element is any one of a light emitting element and a light receiving element.

\* \* \* \* \*